(12) United States Patent
Simon

(10) Patent No.: US 6,828,692 B2
(45) Date of Patent: Dec. 7, 2004

(54) TAMPERING DETECTOR AND SYSTEM DISABLER

(75) Inventor: Michael P. Simon, Fallbrook, CA (US)

(73) Assignee: Payment Protection Systems, Inc., Temecula, CA (US)

( * ) Notice: Subject to any disclaimer, the term of this patent is extended or adjusted under 35 U.S.C. 154(b) by 0 days.

(21) Appl. No.: 10/151,037

(22) Filed: May 21, 2002

(65) Prior Publication Data

US 2003/0218382 A1 Nov. 27, 2003

(51) Int. Cl.[7] .................................................. B60L 1/00
(52) U.S. Cl. ..................... 307/9.1; 307/10.1; 340/5.5; 340/539.23; 340/568.3
(58) Field of Search ............................... 307/9.1, 10.1, 307/10.2; 340/539.23, 5.5, 568.3, 325.36, 426.11, 426.16

(56) References Cited

U.S. PATENT DOCUMENTS

| | | | |
|---|---|---|---|
| 4,736,195 A | * | 4/1988 | McMurtry et al. ....... 340/568.3 |
| 5,291,554 A | | 3/1994 | Morales |
| 5,381,128 A | | 1/1995 | Kaplan |
| 5,510,780 A | | 4/1996 | Norris et al. |
| 5,513,244 A | | 4/1996 | Joao et al. |
| 5,673,305 A | | 9/1997 | Ross |
| 5,708,417 A | * | 1/1998 | Tallman et al. ......... 340/539.23 |
| 5,793,122 A | | 8/1998 | Dingwall et al. |
| 6,021,399 A | | 2/2000 | Demers et al. |
| 6,025,774 A | | 2/2000 | Forbes |
| 6,124,805 A | | 9/2000 | Gabbard |
| 6,206,130 B1 | | 3/2001 | Hetler |
| 6,232,884 B1 | | 5/2001 | Gabbard |
| 6,411,217 B1 | | 6/2002 | Gabbard |
| 6,611,201 B1 | * | 8/2003 | Bishop et al. ............... 340/5.5 |
| 2001/0040504 A1 | | 11/2001 | Gehlot |
| 2002/0041226 A1 | * | 4/2002 | Simon ...................... 340/5.31 |

* cited by examiner

Primary Examiner—Robert DeBeradinis
(74) Attorney, Agent, or Firm—Burns, Doane, Swecker & Mathis, L.L.P.

(57) ABSTRACT

A vehicle disablement device disables a vehicle if it is determined that the vehicle disablement device is being tampered with. A signal is periodically sent from a tamper transmitter to a tamper receiver. A tamper transmitter determines whether the vehicle is being tampered with. The periodic sending of the signal is inhibited if it is determined that the vehicle is being tampered with. The vehicle is disabled if the periodic sending of the signal is inhibited.

18 Claims, 5 Drawing Sheets

TAMPERING DETECTOR AND SYSTEM DISABLER

BACKGROUND OF THE INVENTION

The present invention is related to systems and methods for disabling equipment in response to the failure of a user to perform a specific task. More particulary, the present invention is related to systems and methods for preventing tampering with systems which disable a vehicle in response to the failure of a user to enter a code that corresponds with a stored code in the vehicle.

Typically, monthly payments to utility companies are made with very high reliability. This is partly due to the threat of service cut-off. For example, failure to pay a telephone bill will result in loss of telephone services. Thus, telephone bills are paid regularly because failure to do so has immediate and tangible results. Monthly payments on an automobile loan, for example, are not likely to be paid as regularly. Although an automobile may be repossessed, the process is expensive and complex. Thus, the threat of repossession is less immediate than telephone service cut-off. To encourage reliable loan re-payments, it is desirable to have a "service" cut-off for equipment subject to the loan, such as an automobile.

Conventional systems to encourage reliable loan re-payments interrupt the ignition system of an automobile on a regular, timed interval. To re-enable the automobile, a user is required to return to a payment center, make a payment, and have an agent reset the interrupt mechanism for a renewed timed interval. The system can only be reset by an authorized agent as it requires a key held in escrow at the payment center. While such a system is effective in encouraging users to repay their loans in a timely fashion, it has extreme overhead considerations. For example, the system requires a user to travel to the payment center each payment period of the loan in order to re-enable the automobile. In addition, a user must arrive at the payment center during its customer service hours. Still further, a user may have to wait to receive the attention of the first available agent at the payment center.

One solution to these problems is described in U.S. Pat. No. 6,195,648, entitled "Loan Repay Enforcement System" issued on Feb. 27, 2001 and U.S. patent application Ser. No. 09/397,132, entitled "Time Based Disablement of Equipment" filed on Sep. 16, 1999, both of which are incorporated in their entirety herein by reference. This patent and application describe systems and methods for disabling of equipment if a payment is not timely made. Specifically, a control module associated with the equipment stores a plurality of codes. In order to prevent disablement of the equipment, a code which corresponds to one of the stored plurality of codes must be entered prior to the expiration of a payment period. In order to receive a code, timely payment must be received and logged in a payment center.

If a vehicle disablement device is tampered with or removed, it may be possible to continue to operate the vehicle without having made a proper payment. If it is possible to operate the vehicle without having made a proper payment, the intention of the vehicle disablement device has been overcome. Accordingly, it would be desirable to provide techniques which, in the case that a disablement device is tampered with or removed, the vehicle is still prevented from operating.

SUMMARY OF INVENTION

The above-identified and other deficiencies of prior methods and systems for preventing tampering with a vehicle disablement device. The system includes a vehicle disablement device. The vehicle disablement device disables the critical system of the vehicle if a payment is not made on the vehicle prior to a payment due date. Disablement of the critical system prevents operation of the vehicle. The system also includes a tamper transmitter, the tamper transmitter periodically transmitting a signal. The system also includes a tamper receiver. The tamper receiver disables a critical system when a signal is not received from the tamper transmitter for a predetermined period of time.

In accordance with the present invention, a method for disabling a vehicle is provided. The method includes the step of periodically sending a signal from a tamper transmitter to a tamper receiver. The method also includes the step of determining, by a tamper transmitter, whether the vehicle is being it is being tampered with. The periodic sending of the signal is inhibited if it is determined that the vehicle is being tampered with. The vehicle is disabled if the periodic sending of the signal is inhibited.

BRIEF DESCRIPTION OF THE DRAWINGS

These and other features, aspects, and advantages of the present invention will become better understood with regard to the following description, appended claims and drawings where:

DETAILED DESCRIPTION

In accordance with each of the exemplary embodiments of the invention, there is provided apparatus for and methods of a tamper proof disablement of equipment. It will be appreciated that each of the embodiments described include both an apparatus and a method and that the apparatus and method of one exemplary embodiment may be different than the apparatus and method of another exemplary embodiment.

Figure 1:
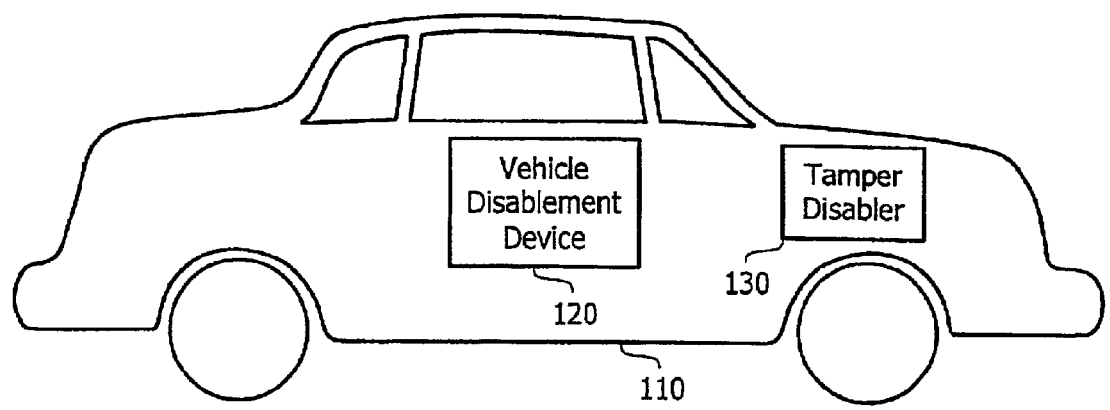
FIG. 1 illustrates a vehicle with a vehicle disablement device and a tamper disabler device in accordance with one exemplary embodiment of the present invention.

FIG. 1 illustrates a vehicle with a vehicle disablement device and a tamper disabler device in accordance with exemplary embodiments of the present invention. As illustrated in FIG. 1, a vehicle 110 is equipped with a vehicle disablement device 120 and a tamper disabler 130. In accordance with exemplary embodiments of the present invention, when it is detected that the vehicle disablement device 120 has been tampered with, a wireless signal is sent from the vehicle disablement device 120 to the tamper disabler 130. The wireless signal can be a radio frequency signal, an infrared signal or any other known type of wireless signal. By sending a wireless signal from the vehicle disablement device 120 to the tamper disabler 130, the tamper disabler 130 can be located in any portion of vehicle 110. Further, since there are no wires connecting vehicle disablement device 120 and tamper disabler 130, it is difficult for a person who is attempting tamper with vehicle disablement device 120, from discovering the existence, let alone the location, of tamper disabler 130. Alternatively, vehicle disablement device 120 and tamper disabler 130 can be connected by a hard-wire connection.

Figure 2:
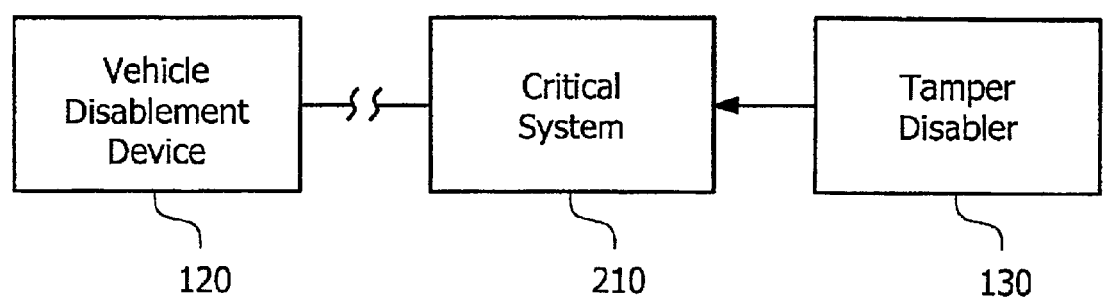
FIG. 2 illustrates the relationship between a vehicle disablement device, a critical system and a tamper disabler in accordance with one exemplary embodiment of the present invention.

FIG. 2 illustrates the relationship between a vehicle disablement 130 device, a critical system of a vehicle and a tamper disabler. As illustrated in FIG. 2, both the vehicle disablement device 120 and the tamper disabler are connected to a critical system 210 of a vehicle. Accordingly, if vehicle disablement device 120 is tampered with such that the device can no longer disable critical system 210, tamper disabler 130, upon receipt of a signal from vehicle disablement device 120, can still disable a critical system 210 of a vehicle.

Since vehicle disablement device 120 may be powered by the vehicle, removing the vehicle disablement device 120 from the vehicle, e.g., by cutting the wires connecting the vehicle disablement device to the vehicle, the vehicle disablement device may no longer have power to send the signal to tamper disabler 130. In accordance with exemplary embodiments of the present invention, the vehicle disablement device can be provided with a battery with a sufficient amount of power for sending the tamper disabling signal to the tamper disabler 130 in case the main source of power to the vehicle disablement device is removed. In accordance with another-exemplary embodiment of the present invention, the vehicle disablement device may store power it has received from the vehicle such that when the vehicle's power to the vehicle disablement device 120 is removed the vehicle disablement device 120 can still transmit the tamper disabling signal. In accordance with a further embodiment of the present invention, vehicle disablement device 120 can be powered by solar cells. The vehicle disablement device 120 can store this power via a capacitor, a rechargeable battery or any other known means for storing power. Since the vehicle disablement device 120 will only need to transmit the tamper disablement signal immediately after a tamper is detected, the amount of power that needs to be stored in the vehicle disablement device can be quite minimal.

Figure 3:
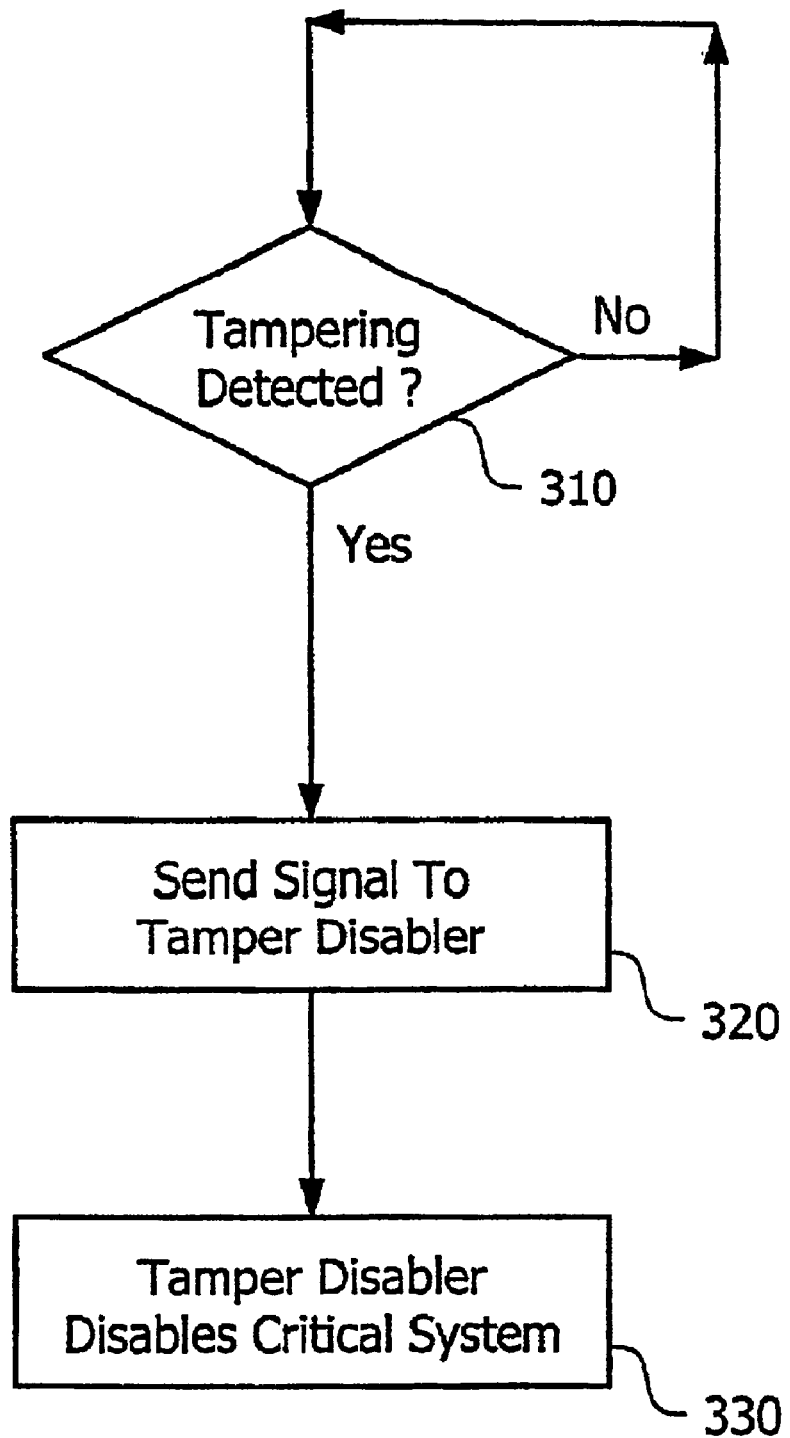
FIG. 3 illustrates a method for tamper disablement in accordance with one exemplary embodiment of the present invention.

FIG. 3 illustrates an exemplary method in accordance with the present invention. Initially, the vehicle disablement device determines whether it has detected a tampering (step 310). In accordance with the present invention there are many techniques for detecting a tampering. In accordance with one embodiment of the present invention, the vehicle disablement device can detect a tampering by determining whether its power from the vehicle has been interrupted. In accordance with another embodiment of the present invention, the tampering can be detected based upon movement of the vehicle disablement device. Typically the vehicle disablement device will be securely mounted in a vehicle. Accordingly, if a movement, other than normal movements due to driving, is detected the vehicle disablement device can determine that a tampering is taking place.

If the vehicle disablement device does not detect tampering ("NO" path out of decision step 310), the vehicle disablement device continues to monitor for tampering. If, however, the vehicle disablement device detects tampering ("YES" path out of decision step 310), then the vehicle disablement device sends a signal to the tamper disabler (step 320). The tamper disabler then disables a critical system of the vehicle, thereby preventing operation of the vehicle (step 330).

Although the system and method described above in connection with FIGS. 1–3 is quite effective in detecting tampering with a vehicle disablement device, there are some drawbacks associated with this system. For example, as discussed above, since the vehicle disablement device may be powered by the vehicle, if the power to the vehicle disablement device were cut, the vehicle disablement device may no longer have power to send the signal to the tamper disabler. Although alternative techniques for overcoming this problem are presented above, these alternative techniques may be either easily circumvented or may add unnecessary complexity to the tamper disabler. It has been recognized that these drawbacks are due to the requirement that a signal be sent upon detection of the tampering.

Figure 4:
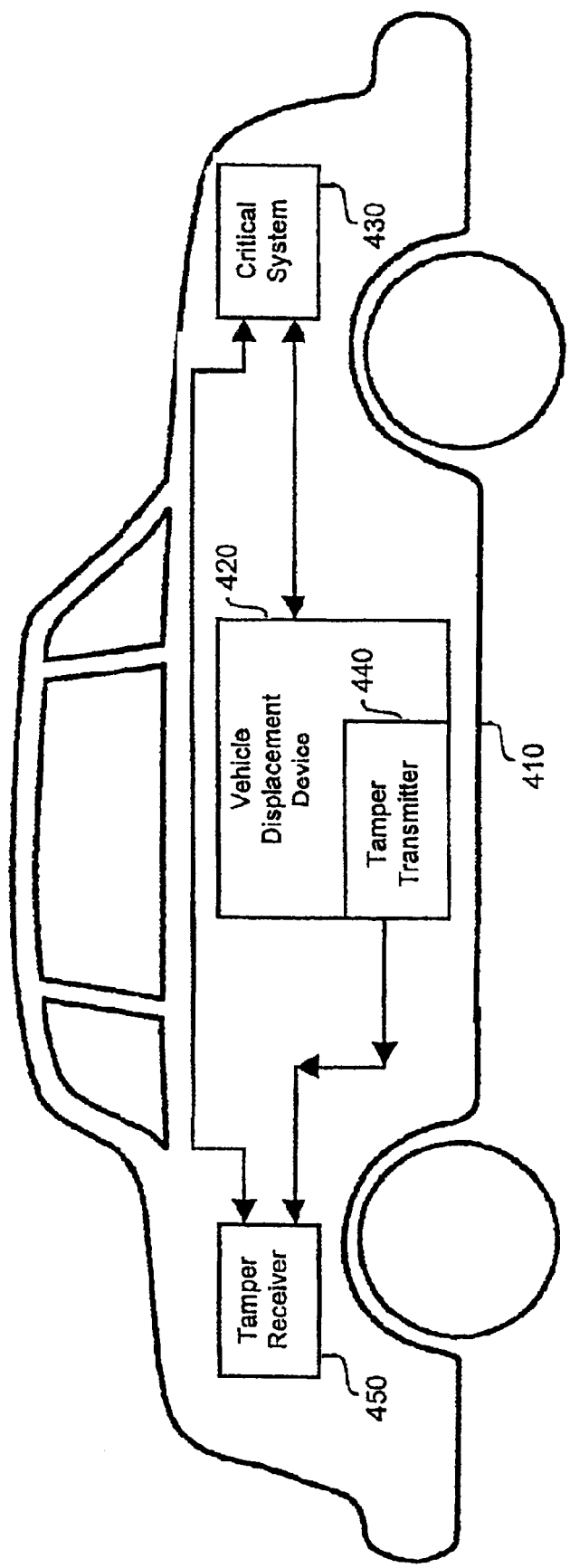
FIG. 4 illustrates a vehicle with a vehicle disablement device and tamper disabler device in accordance with another exemplary embodiment of the present invention.

FIG. 4 illustrates a system which overcomes the above-identified drawbacks of the system and method described in connection with FIGS. 1–3 by continuously transmitting a signal, and by employing the lack of receipt of the signal as trigger to disable the vehicle. As illustrated in FIG. 4, a vehicle 410 includes a vehicle disablement device 420, a critical system 430, a tamper transmitter 440 and a tamper receiver 450. The tamper transmitter 440 can either be a component of the vehicle disablement device 420 or it can be a component separate from the vehicle disablement device 420, but with an interface for communicating with the vehicle disablement device 420. As illustrated in FIG. 4, the vehicle disablement device 420 and the tamper receiver 450 are connected to a critical system 430 of the vehicle 410. Critical system 430 can be any type of system which prevents operation of the vehicle, including, but not limited to, the starter circuit, the ignition circuit or the fuel pump. Moreover, although FIG. 4 illustrates the vehicle disablement device 420 as connected to the same critical system 430 as the tamper receiver 450, these devices can be connected to different critical systems of the vehicle. For example, the vehicle disablement device may disable the starter circuit while the tamper receiver 450 may disable the fuel pump.

In operation, the tamper transmitter 440 will continuously transmit a signal, which is herein referred to as an "all clear signal", to the tamper receiver 420. In accordance with one embodiment of the present invention, the all clear signal can be transmitted for approximately 600 milliseconds every two seconds. If the tamper transmitter detects that the vehicle disablement device is being tampered with, the tamper transmitter ceases the transmission of the all clear signal. When the tamper receiver 450 determines that it has not received the all clear signal for a predetermined amount of time, e.g., 20 seconds, the tamper receiver 450 will disable a critical system 430.

Figure 5:
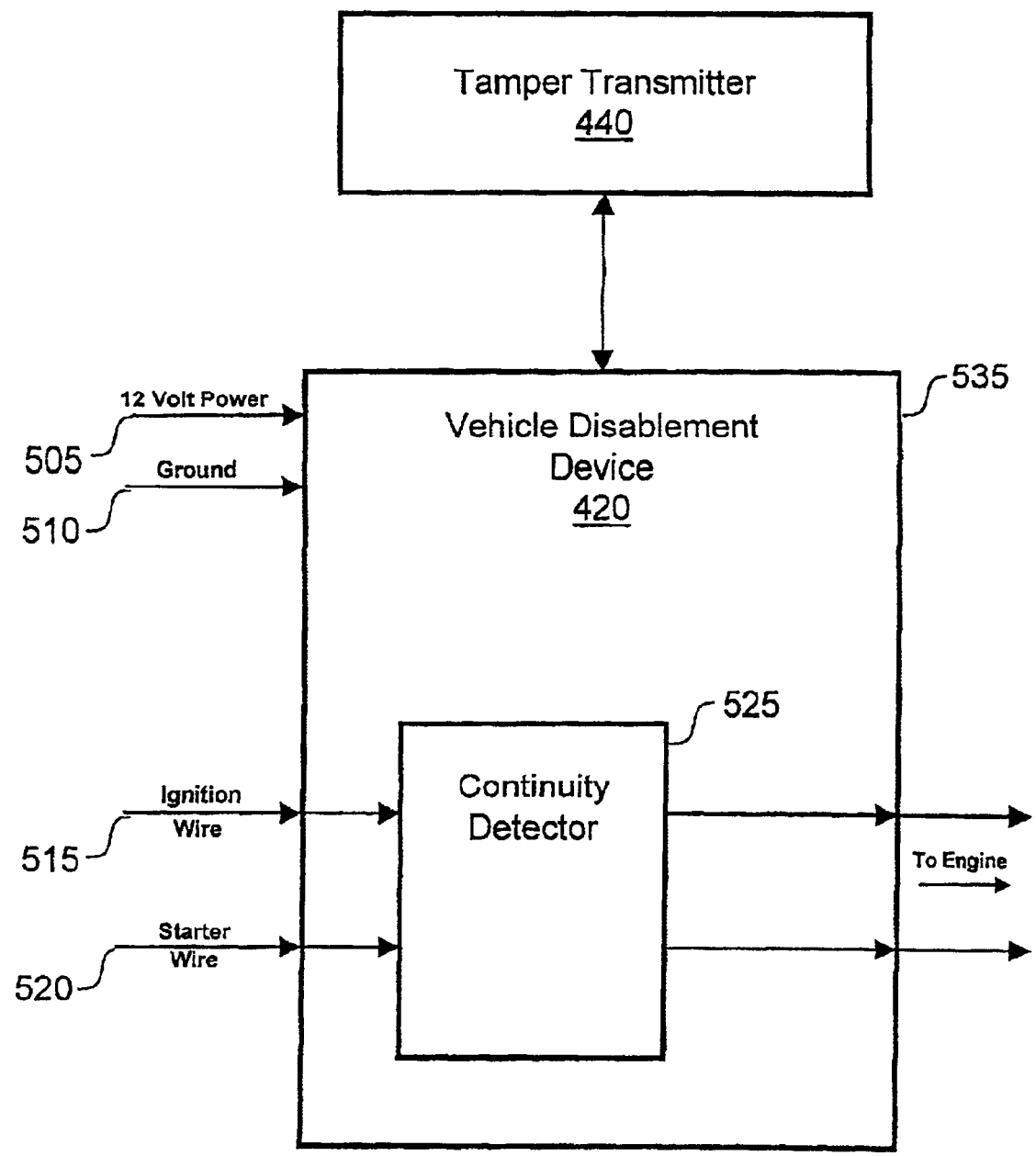
FIG. 5 illustrates an exemplary vehicle disablement device and tamper transmitter in accordance with the present invention.

In addition to the techniques described above in connection with FIG. 3, additional techniques for detecting tampering can be employed. Prior to a detailed description of these additional techniques, a more detailed description of the vehicle disablement device is provided in connection with FIG. 5. As illustrated in FIG. 5, the vehicle disablement device 420 receives power from the vehicle's 12 volt power wire 505 and the ground wire 510. In addition, an ignition wire 515, from the vehicle's ignition (not shown), passes through a continuity detector 525, in the vehicle disablement device, and out of the vehicle disablement device 420 to the vehicle's engine (not shown). Similarly, a starter wire 520 passes through continuity detector 525 in the vehicle disablement device 420 and continues on to the engine (not shown). The vehicle disablement device communicates with tamper transmitter 440 via bidirectional communication line 535. Continuity detector 525 is illustrated as a separate component within the vehicle disablement device 420 for ease of illustration. However, it should be recognized that continuity detector can be either a discrete component within the vehicle disablement device 420 or it could be a function performed by a microprocessor (not shown) of the vehicle disablement device. If the continuity detector functionality is performed by the microprocessor, this functionality will be contained either software code or hard-wired logic, either within the microprocessor itself or as a separate component the vehicle disablement device.

Although not illustrated in FIG. 5, it will be recognized that the vehicle disablement device will contain a mechanism for disabling the vehicle. For example, the vehicle disablement device could contain a relay which is set to open when an appropriate code has not been entered into the vehicle disablement device prior to the expiration of a payment due deadline. The relay could be arranged such that the starter wire or the ignition wire passes through the relay. Alternatively, if the vehicle is disabled by disabling a critical system other then the ignition or starter circuits, the circuit for the other critical system will loop through a relay in the vehicle disablement device, thereby allowing the vehicle disablement device to disable the vehicle when an appropriate code has not been entered into the vehicle disablement device prior to the expiration of a payment due deadline.

Now that a more detailed description of the vehicle disablement device has been provided, a description of techniques for detecting tampering will be described. If either the 12 volt power wire 505 or the ground wire 510 are cut, a tampering will be detected by the tamper transmitter. Specifically, the tamper transmitter will recognize that the power to the vehicle disablement device 420 has been cut, and therefore, the tamper transmitter will stop sending the all clear signal to the tamper receiver. If either the 12 volt power wire 505 or the ground wire 510 are cut, the tamper transmitter will stop sending the all clear signal regardless of whether a payment due deadline has passed without an associated code being entered into the vehicle disablement device.

If the continuity detector 525 determines that the ignition wire 515 has been cut and that the starter has been energized, the vehicle disablement device will indicate to the tamper transmitter that a tampering has been detected. It will be recognized that if the ignition wire is cut and the starter is energized, this indicates that the starter has been energized by jumping the vehicle, for example, by rolling the vehicle down a hill and popping the vehicle into gear. If the ignition wire has been cut and the starter has been energized, the tamper transmitter will stop sending the all clear signal regardless of whether a payment due deadline has passed.

If the continuity detector determines that the starter wires have been cut and if a payment due deadline has passed and a code associated with the payment due deadline has not been entered into the vehicle disablement device, then the vehicle disablement device will inform the tamper transmitter that a tampering has been detected. The tamper transmitter will then stop sending the all clear signal. In addition, if it is determined that the starter has been energized by jumping the vehicle and if a payment due deadline has passed and a code associated with the payment due deadline has not been entered into the vehicle disablement device, the tamper transmitter will stop sending the all clear signal. In addition, although not technically a tamper condition, if a payment due deadline has passed and a code associated with the payment due deadline has not been entered into the vehicle disablement device, and if the ignition circuit is energized, the tamper transmitter will inhibit sending the all clear signal.

Figure 6A:
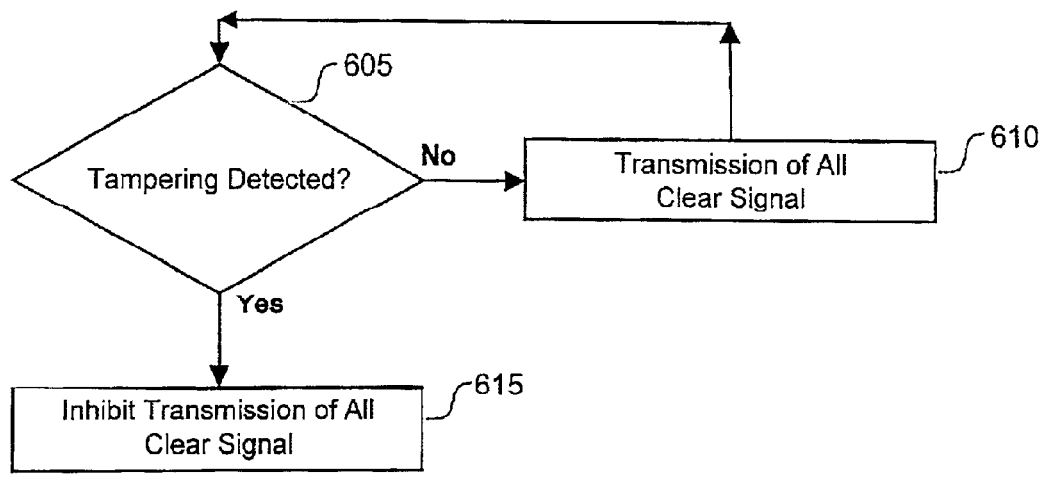
FIG. 6A illustrates an exemplary method for a tamper disabler transmitter in accordance with another exemplary embodiment of the present invention.

FIG. 6A illustrates an exemplary method for the tamper transmitter in accordance with the present invention. Initially, the tamper transmitter determines whether tampering has been detected (step 605). The determination of whether tampering has been detected can be performed using any of the techniques described above. If tampering has not been detected ("No" path out of decision step 605), then the tamper transmitter sends an all clear signal to the tamper receiver (step 610). After sending the all clear signal, the tamper transmitter again determines whether a tampering has been detected (step 605). If tampering has been detected ("Yes" path out of decision step 605), then the tamper transmitter inhibits the transmission of the all clear signal (step 615).

Figure 6B:
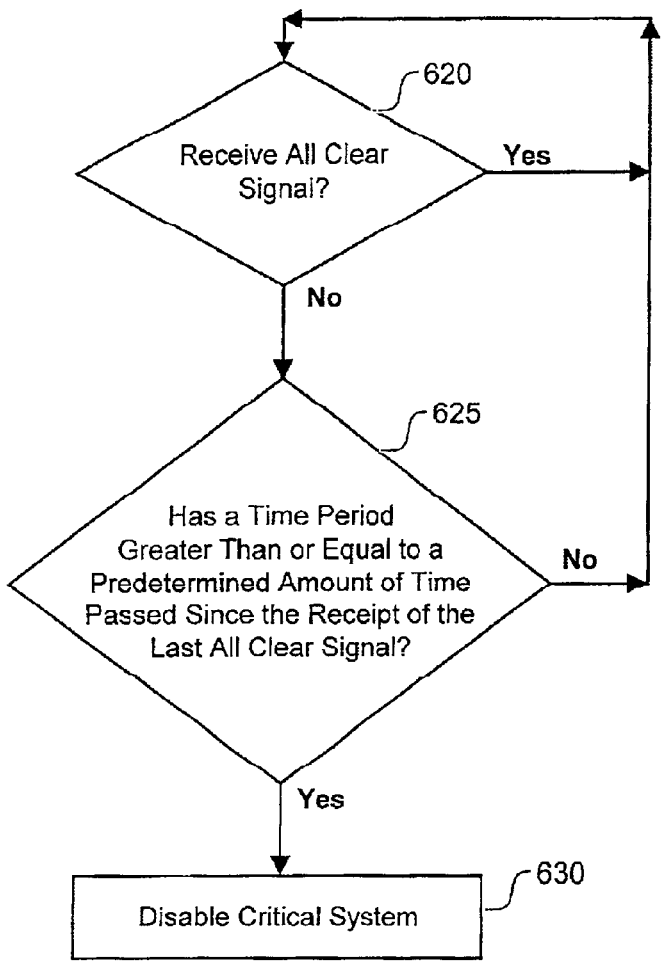
FIG. 6B illustrates an exemplary method for a tamper disabler receiver in accordance with another exemplary embodiment of the present invention.

FIG. 6B illustrates an exemplary method for the tamper receiver in accordance with the present invention. Initially, the tamper receiver determines whether it has received an all clear signal from the tamper transmitter (step 620). If the tamper receiver has received an all clear signal ("Yes" path out of decision step 620), then the tamper receiver again determines whether an all clear signal has been received (step 620). If the tamper receiver determines that it has not received an all clear signal ("No" path out of decision step 620), then it is determined whether a period equal to or greater then a predetermined amount of time has passed since the last receipt of an all clear signal (step 625). In accordance with one embodiment of the present invention, the predetermined amount of time can be 20 seconds. If it has been less then the predetermined amount of time since the receipt of the last all clear signal ("No" path out of decision step 625), then the tamper receiver again determines whether it has received an all clear signal (step 620). If, however, a period of time equal to, or greater then, the predetermined amount of time has passed since the last receipt of an all clear signal ("Yes" path out of decision step 625), then the tamper receiver will disable a critical system of the vehicle (step 630).

Although not illustrated in FIGS. 3 and 6A, the method can also include the steps of: the user inputting the code into a time-based equipment disablement device; the time based disablement device comparing the code received from the user with codes stored in memory; and if there is a match, storing an indication in the time-based disablement device that the code has been entered, thereby allowing the user to operate the equipment associated with the time-based disablement device until the date and/or time associated with a code which has not been entered has occurred. In addition, the method can include the steps of: determining whether a date and/or time has occurred; if the date and/or time has occurred, determining whether a code associated with the date and/or time has been input into the time-based equipment disablement device; disabling the equipment if the code has not been previously entered; and allowing the equipment to operate if the code has been previously entered. Further, the disablement device can include a plurality of lights, e.g., light emitting diodes, to indicate if the end of a payment period is upcoming. For example, a green light would indicate that no payment is due, a yellow light would indicate that a payment is due shortly, and a red light would indicate that a payment is due immediately or the equipment will be disabled. Further, the lights can blink at an increasing frequency the closer in time it is to a payment due deadline. In addition to the use of lights to indicate whether a payment is upcoming or due, an audible beep or other sound can be used to indicate such. For example, a single beep can be used to indicate that a payment is upcoming and a constant beep can indicate that a payment is passed due.

Although exemplary embodiments of the present invention have been described in connection with particular types of vehicle disablement devices, it will be recognized that the present invention is equally applicable to any type of vehicle disablement devices. Further, although exemplary embodiments of the present invention have been described in connection with a vehicle disablement device, it will be recognized that the present invention is equally applicable to any type of disablement device. Additionally, although exemplary embodiments of the present invention were described in connection with loan payments, the present invention is equally applicable to any other type of financing arrangements including leases and the like. Moreover, although it has been described that the vehicle disablement device detects the tampering and sends a signal to the tamper disabler, another device can be used to perform the detecting and sending. In addition, the tamper disabler can perform the detecting, thereby obviating the sending step.

Although the present invention has been described in considerable detail with clear and concise language and with reference to certain exemplary embodiments thereof including the best mode anticipated by the inventors, other versions are possible. Therefore, the spirit and scope of the invention should not be limited by the description of the exemplary embodiments contained therein.

What is claimed is:

1. A system for disabling a vehicle, the vehicle including a critical system, the system comprising:
    a vehicle disablement device, wherein the vehicle disablement device disables the critical system of the vehicle if a payment is not made on the vehicle prior to a payment due date, wherein disablement of the critical system prevents operation of the vehicle;
    a tamper transmitter, wherein the tamper transmitter periodically transmits a signal; and
    a tamper receiver, wherein the tamper receiver disables a critical system when a signal is not received from the tamper transmitter for a predetermined period of time.

2. The system of claim 1, wherein the tamper transmitter inhibits transmission of the signal when tampering with the vehicle is detected.

3. The system of claim 2, wherein the tamper transmitter detects the tampering.

4. The system of claim 3, wherein the tampering detected by the tamper transmitter is tampering with the vehicle disablement device.

5. The system of claim 1, wherein the critical system disabled by the vehicle disablement device and the critical system disabled by the tamper receiver are different critical systems.

6. The system of claim 5, wherein a critical system disabled by the vehicle disablement device is a starter circuit of the vehicle and the critical system disabled by the tamper receiver is a gas line of the vehicle.

7. The system of claim 1, wherein a vehicle is a motor vehicle.

8. The System of claim 1, wherein the tamper transmitter and the tamper receiver communicate with each other through a hard wired connection.

9. The system of claim 1, wherein tamper transmitter and the tamper receiver communicate with each through a wireless connection.

10. The system of claim 1, wherein the tamper transmitter is a component of the vehicle disablement device.

11. The system of claim 1, wherein the tamper transmitter is a separate component from the vehicle disablement device, and the tamper transmitter interfaces with the vehicle disablement device.

12. The system of claim 1, wherein the vehicle disablement device further comprises:
    red, yellow and green lights which illuminate to indicate whether a payment for the vehicle is due.

13. A method for disabling a vehicle comprising the steps of:
    disabling, by a vehicle disablement device, a critical system of the vehicle coupled to the vehicle disablement device to prevent operation of the vehicle if a payment is not made on the vehicle prior to a payment due date;
    periodically sending a signal from a tamper transmitter to a tamper receiver;
    determining, by a tamper transmitter, whether the vehicle is being tampered with;
    inhibiting the periodic sending of the signal if it is determined that the vehicle is being tampered with; and
    disabling, by the tamper receiver, a critical system of the vehicle coupled to the tamper receiver if the periodic sending of the signal is inhibited.

14. The method of claim 13, wherein the disabling by the tamper receiver comprises the steps of:
    determining, by the tamper receiver, whether a predetermined amount of time has passed since the last periodic signal has been received; and
    disabling, by the tamper receiver, the critical system of the vehicle coupled to the tamper receiver if it is determined that the predetermined mount of time has passed since the last periodic signal has been received.

15. The method of claim 14, wherein the step of disabling a critical system of the vehicle coupled to the tamper receiver further comprises the step of:
    interrupting power to a fuel pump of the vehicle.

16. The method of claim 14, further comprising the steps of:
    determining whether a code has been entered into the vehicle disablement device prior to the due date;
    wherein the disabling, by the vehicle disablement device, of the critical system of the vehicle coupled to the vehicle disablement device occurs if the code has not been entered prior to the due date.

17. The method of claim 13, wherein the tamper transmitter interfaces with the vehicle disablement device, and whether the vehicle is being tampered with is detected by detecting that a power wire of the vehicle disablement device has been severed, detecting that a ground wire of the vehicle disablement device has been severed, or detecting whether a starter wire passing through the vehicle disablement device has been cut.

18. The method of claim 13, wherein the critical system coupled to the tamper receiver and the critical system coupled to the vehicle disablement device are different critical systems of the vehicle.

* * * * *